Oct. 1, 1940. B. A. McKEAN 2,216,557
SCREW DRIVING DEVICE
Filed Oct. 21, 1937
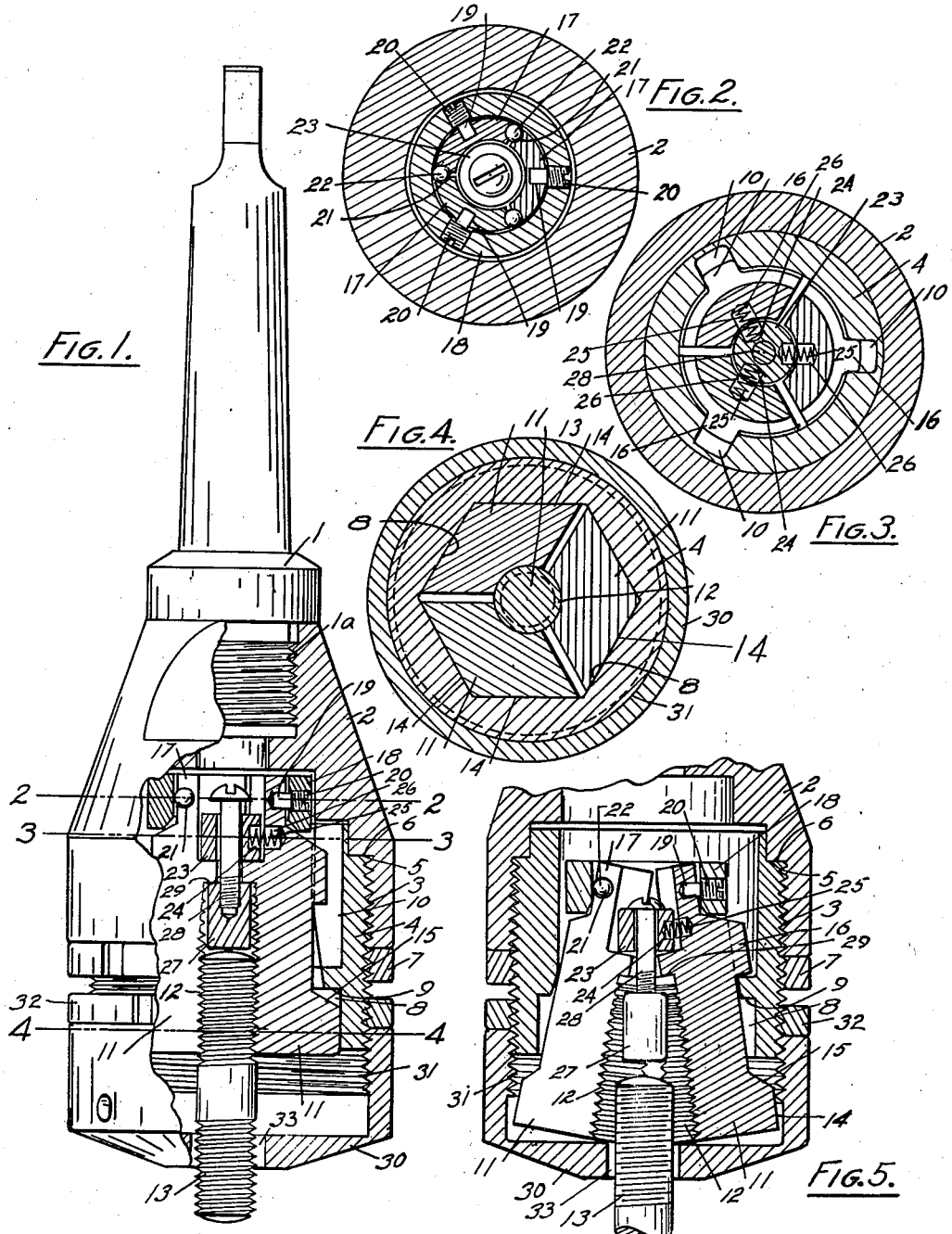
INVENTOR.
Boyd A. McKean
BY
ATTORNEYS.

Patented Oct. 1, 1940

2,216,557

UNITED STATES PATENT OFFICE 2,216,557

SCREW DRIVING DEVICE

Boyd A. McKean, Erie, Pa., assignor to Titan Tool Company, Fairview, Pa., a corporation of Pennsylvania Application October 21, 1937, Serial No. 170,208

3 Claims. (Cl. 81—112)

This invention is in the nature of an improvement on Patent No. 1,807,265 issued May 26, 1931. In the structure referred to the jaws were locked against turning at a point on the jaws remote from the engagement of the jaws with the article being driven. This off-setting of the driving end of the jaws from the driven end of the jaws tended to twist the jaws in the head and subject them to undue strain. In the present invention the jaws are locked against turning relatively to the head at a point approximating the engagement of the jaws with the article being driven so that the cocking tendency is eliminated. As exemplified, the device is arranged for driving studs. The invention also contemplates improvements in the details of the structure, features and details of the invention appearing more fully from the specification and claims.

A preferred embodiment of the invention is illustrated in the accompanying drawing:

Fig. 1 shows an elevation of the device partly in section on a plane through the axis of the device, the jaws being shown in set position.

Fig. 2 a section on the line 2—2 in Fig. 1.

Fig. 3 a section on the line 3—3 in Fig. 1.

Fig. 4 a section on the line 4—4 in Fig. 1.

Fig. 5 a section similar to Fig. 1 but showing the jaws in released position.

1 marks a tool shank. This has a screw-threaded end 1a which is screwed into a shank extension 2. The shank extension has an interiorly screw-threaded socket 3 into which a head 4 is screwed. The head has a shoulder 5 which is adapted to engage a shoulder 6 in the extension socket. The head is also locked with the extension by a lock nut 7 which is screwed on to the outer surface of the head against the end of the extension. The head has a locking surface 8. As shown, this is in the shape of a hexagon. The head is provided with stop shoulders 9. Longitudinal grooves 10 are arranged on the inner periphery of the head above the shoulder 9.

Jaws 11 are, in the exemplification shown, provided with screw-threads 12 which are adapted to engage screw-threads of a stud 13 which is being operated upon. The outer faces of the lower ends of the jaw are provided with surfaces 14 which conform to the engaging surfaces 8, that is to say with three jaws as shown. The outer surfaces of the assembled three jaws form a hexagon. The jaws are also provided with cam surfaces 15 which surfaces are adapted to engage the lower end of the head when the jaws are drawn into the head in setting the device. The jaws are also provided with ribs 16 which extend into the grooves 10 and thus lock the jaws against turning, particularly when the jaws are in release position so that when the jaws are drawn into the locking surfaces they will be in register. These shoulders 16 also are adapted to engage the stop shoulder 9 and limit the release movement of the jaws. The jaws have shank extensions 17 which extend into an assembly ring 18. These shank extensions are provided with sockets 19, and screws 20 extend through the ring 18 into these sockets, thus locking the jaws with the ring. The shank extensions have sockets 21 on their edges in which balls 22 are arranged, these balls forming a bearing on which the jaws turn in opening and closing. These balls also slightly space the jaws one from the other so as to avoid friction.

A collar 23 is arranged within the jaws. This collar is provided with sockets 24. Springs 25 are arranged in these sockets and extend into sockets 26 in the jaws. These springs yieldingly tend to open the jaws when they are moved to release position.

A stop plug is arranged between the jaws. It is secured by a screw 28 with the collar or head 23. The plug 27 engages stop shoulders 29 on the inner surfaces of the jaw. This stop plug really forms a stop for the stud limiting its upward movement in the jaws and also preferably initially locates the stud with relation to the jaws as the tool is closed. The plug engaging the stud as the tool is depressed forces the jaws upwardly from release position into set position.

A stop cap 30 is provided with interior screw-threads 31 so that it may be screwed on to the head. This cap may be adjusted relatively to the head by this screw connection and locked in adjustment by the lock nut 32. The cap is provided with an opening 33 through which the stud extends. In the operation of the device it is brought down over a stud, the action of the stud on the plug 27 moves the jaws upwardly, the cam surfaces 15 engaging the end of the head, close the jaws and draw the driving surfaces 8 into the driving surfaces 14. The continued rotation of the head then drives as the stud advances, the head being retained. The jaws are drawn downwardly until the driving surface is released, draws them open and relieve the driving action. By setting the cap this may be at any point desired. The length of the plug 27 may also be utilized for setting the stud in proper relation to the jaws. The tool may be withdrawn after the jaws are open and is ready for a second operation.

What I claim as new is:

1. In a screw driving device, the combination of a head having a socket, said socket having jaw locking surfaces; separable jaws axially movable in the head and having inner driving engaging surfaces and outer locking surfaces, the outer surfaces engaging the locking surfaces of the head and locking the jaws with the head when drawn into the socket, said outer and inner surfaces of the jaws being radially opposed; and means movably mounting the jaws in the head comprising sockets in the opposing edges of the jaws, and balls arranged in the sockets.

2. In a screw driving device, the combination of a head having a socket, said socket having jaw locking surfaces; separable jaws axially movable in the head and having inner driving engaging surfaces and outer locking surfaces, the outer surfaces engaging the locking surfaces of the head and locking the jaws with the head when drawn into the socket, said outer and inner surfaces of the jaws being radially opposed, said jaws having jaw extensions with exterior sockets and also sockets in the opposing edges; a ring into which the jaws extend; pins on the ring extending into the exterior sockets in the jaws; and balls arranged in the sockets in the edges of the jaws.

3. In a screw driving device, the combination of a head with a socket, said socket having jaw locking surfaces; separable jaws axially movable in the head and having inner driving engaging surfaces and outer locking surfaces, the outer locking surfaces engaging the locking surfaces of the head and locking the jaws with the head when drawn into the socket, said jaws having shank extensions forming an interior socket forming shoulders at the bottom of the socket; a ring engaging the upper ends of the shank extensions, a second head in the socket engaging the shoulders; a stop plug connected with the second head and arranged within the driving surfaces of the jaws; and springs between the second head and the jaws yieldingly opening the jaws.

BOYD A. McKEAN.